United States Patent [19]
Woolley

[11] Patent Number: 5,934,844
[45] Date of Patent: Aug. 10, 1999

[54] CUTTING INSERT

[75] Inventor: Barry Woolley, South Staffordshire, United Kingdom

[73] Assignee: Sandvik Aktiebolag, Sandviken, Sweden

[21] Appl. No.: 09/051,204

[22] PCT Filed: Oct. 1, 1996

[86] PCT No.: PCT/SE96/01228

§ 371 Date: Jun. 1, 1998

§ 102(e) Date: Jun. 1, 1998

[87] PCT Pub. No.: WO97/12711

PCT Pub. Date: Apr. 10, 1997

[30] Foreign Application Priority Data

Oct. 6, 1995 [GB] United Kingdom ............... 9520436

[51] Int. Cl.⁶ .................................................. B23B 27/22
[52] U.S. Cl. ........................... 407/114; 407/115; 407/116
[58] Field of Search .................... 407/62, 64, 113, 407/114, 115, 116, 120

[56] References Cited

U.S. PATENT DOCUMENTS

| | | |
|---|---|---|
| 3,187,406 | 6/1965 | Franko ................................ 407/114 |
| 3,786,541 | 1/1974 | Lundgren . |
| 3,968,550 | 7/1976 | Gehri . |
| 4,247,232 | 1/1981 | McCreery ........................... 407/114 |
| 4,606,678 | 8/1986 | Zweekly . |
| 4,626,140 | 12/1986 | Zweekly ............................. 407/114 |
| 5,116,167 | 5/1992 | Niebauer ............................. 407/116 |
| 5,203,649 | 4/1993 | Katbi et al. . |

FOREIGN PATENT DOCUMENTS

DL 0260238  9/1988  European Pat. Off. ............... 407/114

*Primary Examiner*—Andrea L. Pitts
*Assistant Examiner*—Henry W. H. Tsai
*Attorney, Agent, or Firm*—Burns, Doane, Swecker & Mathis, L.L.P.

[57] ABSTRACT

A round cutting insert, normally made of cemented carbide, for turning operations is provided. It comprises a top surface, a round clearance surface, and a bottom surface. The top surface comprises a number of main, circumferentially spaced chip-breaking grooves. Essential for the invention is that each of the main grooves comprises a further chip-breaking groove which is encircled by the main groove. Thanks to the superposed grooves, the insert becomes very versatile, with good chip control both at low and high feeds, as well as at small and large cutting depths.

8 Claims, 2 Drawing Sheets

U.S. Patent  Aug. 10, 1999  Sheet 1 of 2  5,934,844

CUTTING INSERT

BACKGROUND OF THE INVENTION

The present invention relates to cutting inserts of the type that are referred to as disposable cutting inserts or indexable cutting inserts and which are adapted to be detachably mounted on a tool holder for mounting in a machine tool for cutting operations, primarily turning operations. More particularly still, the present invention is concerned with the formation of the cutting edge land area and the chip controlling groove in a circular cutting insert. Such cutting inserts are usually made of coated or uncoated cemented carbide but different ceramic hard materials are also feasible.

A round cutting insert can often cope with a large variety of profiling operations ranging from finishing to roughing. Their round relief surface is usually of a frustoconical shape in order to allow for sufficient clearance. Because of this clearance, they are normally single-sided. They have a wide capability in chip control and are allrounders that generate a good surface texture even at high feed rates. However, they also entail some drawbacks, such as the fact that it is not possible to choose a particular entering angle at a particular cutting depth. Furthermore, it is not possible to select an appropriate entering angle as a function of the feed. This of course is due to the fact that round inserts have a basically uniform cutting geometry around the whole circular cutting edge. As examples of such cutting inserts, reference is made to U.S. Pat. No. 4,606,678.

In U.S. Pat. No. 3,383,748 a round cutting insert is disclosed with a circumferential chip-breaking groove along the circular cutting edge. This groove may have a varying width and depth and is stated to produce chip control at light chip loads as well as at heavy chip loads by orienting the groove in the appropriate position with respect to the active portion of the cutting edge. However, this cutting insert causes swarfing problems in general and does not work satisfactorily, particularly at small cutting depths, because the chips are not broken properly.

Further, DD-C-264 391 discloses a round cutting insert which comprises six planar chip surfaces around the circular cutting edge. However, in practice, this cutting insert does not work properly because the planar chip surfaces do not manage to break the chips, which rather pass over the step-like shoulder unbroken. Further, the center island extends at six points practically to the very cutting edge, which is impractical because these extending portions become fragile and easily broken.

SUMMARY

Thus, it is a primary object of the present invention to provide a round cutting insert which achieves a good chip control at low as well as high feeds.

It is a further object of the present invention to provide a round cutting insert which achieves a good chip control at small as well as large cutting depths.

Still another object of the present invention is to provide a round cutting insert which can be indexed according to different cutting depths and feeds.

These and further objects have been achieved by shaping the cutting insert according to the features as defined in claim 1. Preferred embodiments of the cutting insert are defined in the dependent claims.

A preferred embodiment of the invention will now be described with reference to the appended drawings. A brief description of the drawings follows below.

DETAILED DESCRIPTION OF THE PREFERRED EMBODIMENT

Figure 1:
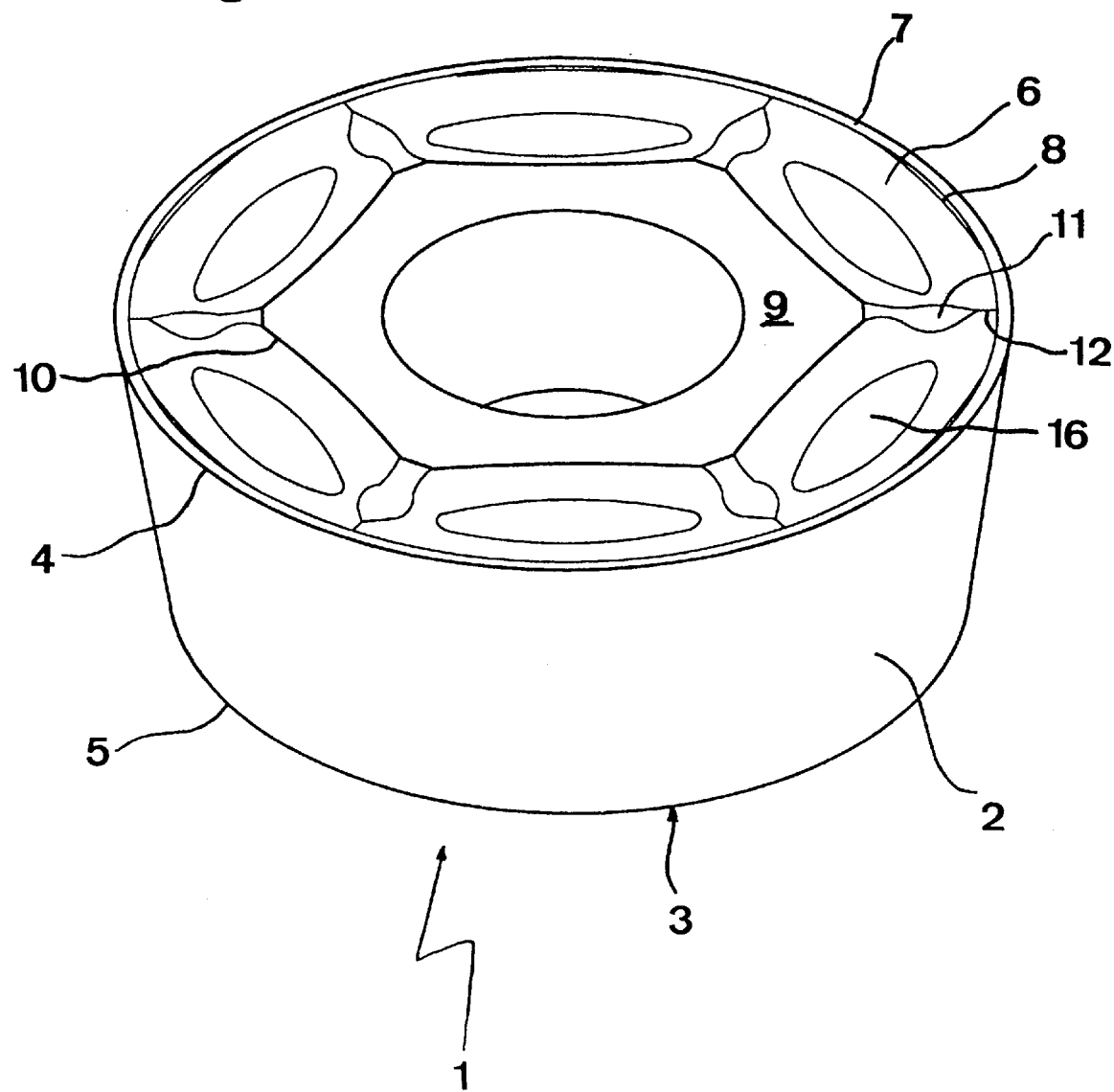
FIG. 1 shows a perspective view of a cutting insert according to the invention, obliquely from above.
Figure 2:
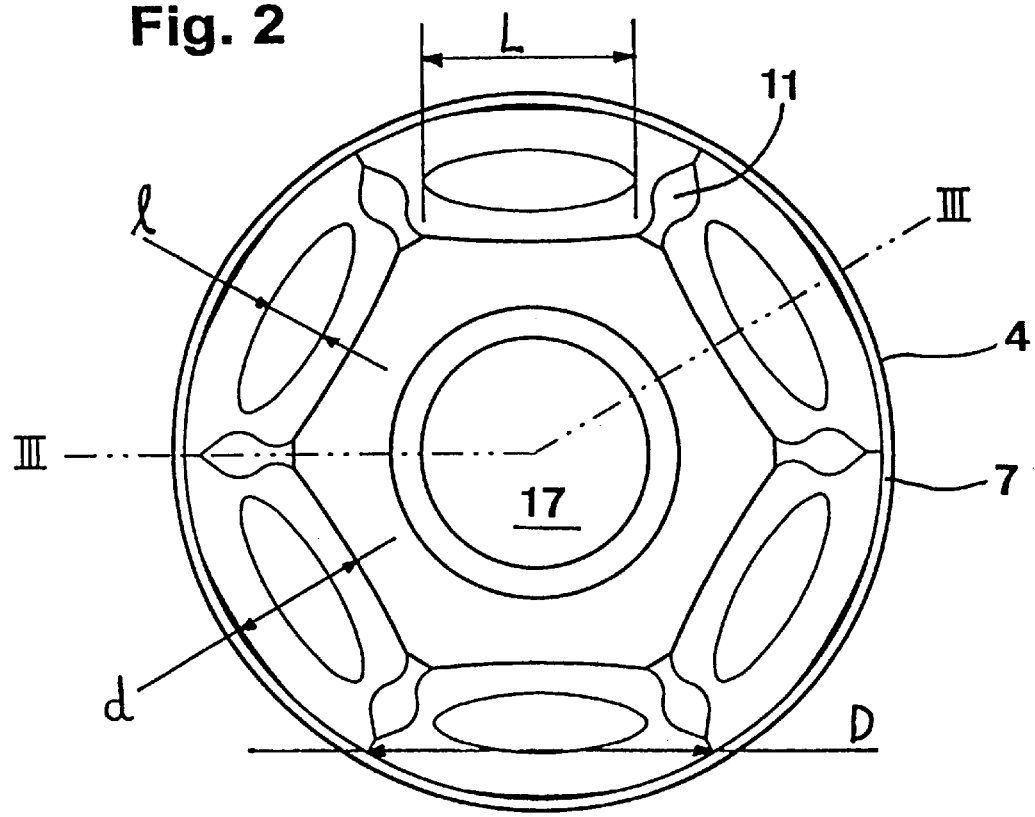
FIG. 2 shows a top view of the cutting insert according to FIG. 1.

The illustrated cutting insert according to the present invention is generally designated by reference numeral 1. It comprises a top surface, a round clearance surface 2 and a planar bottom surface 3. The clearance surface 2 may be substantially perpendicular to the top surface and the bottom surface 3, thus with an insert-inherent clearance angle of about 0°. In this case the insert may be provided as a double-sided cutting insert, with the top surface and the bottom surface being substantially equal. In this case also, the center island 9 functions as a support surface. However, in order to provide efficient clearance, the clearance surface 2 is preferably somewhat tapered, so that the diameter of the substantially circular cutting edge 4 is larger than the diameter of the circular bottom edge 5. This is the embodiment illustrated in the figures. The clearance angle of surface 2 to the plane of the cutting edge 4 is then suitably between +3 and +15°, preferably between +4 and +12°.

The top or upper surface comprises circumferentially spaced chip grooves 6. These are recessed with the basic shape of a rounded, oval groove. Radially outwards, these recesses are delimited by a primary land 7 adjoining the cutting edge 4. At the central part of a groove 6, there may be a small, steep interstep 8 between the groove 6 and the primary land 7.

Radially inwards, the grooves 6 are delimited by the above mentioned center island 9, which according to the preferred embodiment has the basic shape of a regular hexagon with somewhat concave sides 10. Suitably, the radii of the sides 10 are substantially equal and are larger than the radius of the cutting edge 4. Further, suitably, the horizontal plane of the center island 9 is at a higher level than the horizontal plane defined by the cutting edge 4. Depending on the absolute size of the insert, this difference of heights may lie within the range of 0,1 to 1,5 mm, preferably between 0,2 and 1,2 mm.

Figure 3:
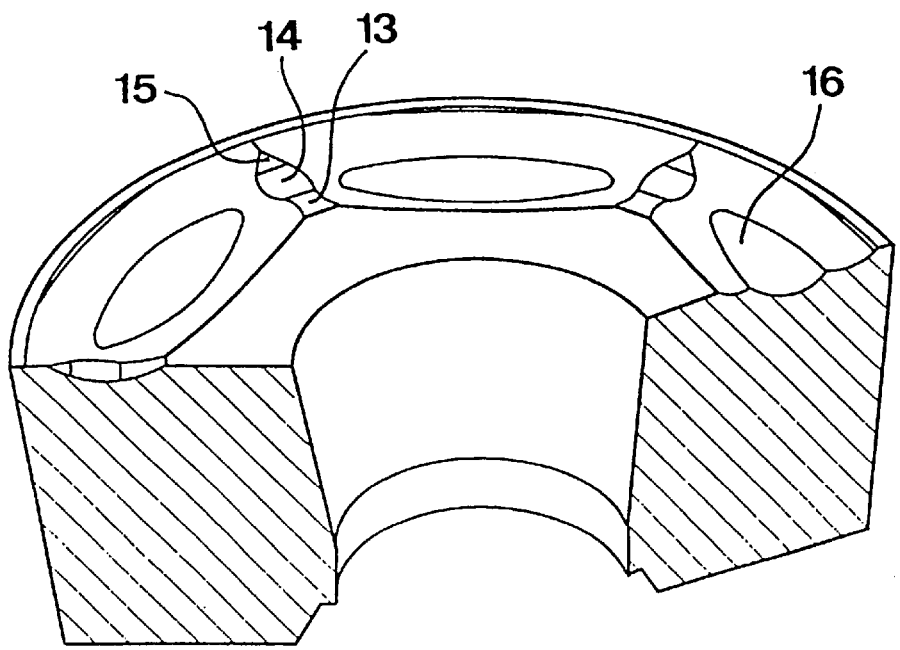
FIG. 3 shows a perspective view of the cutting insert sectioned at III—III in FIG. 2, obliquely from above.

Between each pair of adjacent, substantially equal grooves 6, is located an interspacing depression 11 which extends radially from a corner point of the center island 9 towards the cutting edge 4, however without reaching said edge. The top edge of depression 11 may suitably comprise radially concave portions. The two grooves 6 on each side of depression 11 slope upwardly towards said depression, whereby the lowest point of the depression 11 is located higher than the interception line between a recess 6 and its appurtenant further recess 16. In spite of this, detail 11 is still called a "depression", because it is situated lower than the primary land 7 and the center island 9. Preferably, the depression 11 does not extend to the primary land 7: a short ridge 12 extends substantially radially from the end of depression 11 to the primary land 7. This ridge 12 can be either substantially horizontal or be somewhat inclined upwardly in a direction radially outwards. The top of depression 11 may be subdivided into a radial sequence of segments, as illustrated in FIG. 3. Thus, radially outwardly, a depression 11 may comprise top surface segments 13, 14 and 15. Each of those may be either planar or concavely curved.

An important feature of the present invention is that each recess 6 comprises a second superposed, inscribed, elongated groove 16, which serves to break chips at smaller cutting depths and which thus is in its entirety located within the boundaries of the main recess 6. Similar to the main groove 6, it has a basically concavely rounded, oval surface. Thanks to this second groove or recess, in combination with the indexability of the insert, the insert of the present invention becomes remarkably versatile, with a superior chip control both at small and large cutting depths. The maximal width l of recess 16 amounts to between 20 and 60% of the maximal width d of recess 6, while the maximal length L of recess 16 amounts to between 40 and 90% of the maximal length D of recess 6.

According to the illustrated embodiment, the cutting insert comprises six circumferentially spaced recesses 6, thus resulting in a hexagonally shaped center island 9. However, the number of recesses 6, and thereby, also recesses 16, may also be smaller or larger. Thus, the number of recesses 6 may vary between 4 and 16, preferably between 4 and 8.

Further, the cutting edge may be honed or rounded in a manner known per se. The obtained cutting edge radius is suitably between 25 and 100 μm.

As may be seen in the figures, the cutting insert suitably has a central through hole 17 for fastening the insert on a tool holder.

I claim:

1. A cutting insert for metal cutting machining, comprising a substantially round body of a hard material, and comprising a top surface, a round clearance surface and a bottom surface, a circumferential cutting edge formed between the top surface and the round clearance surface, the top surface comprising a series of main circumferentially spaced chip-breaking recesses wherein each main recess comprises a further chip-breaking recess which in its entirety is located within the boundaries of and encircled by the main recess, wherein a depression is located between each adjacent pair of main recesses.

2. The insert according to claim 1, wherein the lowest point of said depression is located higher than the interception line between a main recess and its appurtenant further recess.

3. The insert according to claim 1, wherein said main recess and depressions circumscribe a center island of said top surface, which is located in a higher plane than the circumferential cutting edge of the insert.

4. The insert according to claim 1, wherein each main recess is delimited by the center island, a primary land adjacent to the cutting edge and two depressions.

5. The insert according to claim 1, wherein the number of main recesses amounts to between 4 and 8.

6. The insert according to claim 1, wherein each further chip-breaking recess has a maximum width that is 20%–60% of a maximum width of each main recess.

7. The insert according to claim 1, wherein each further chip-breaking recess has a maximum length that is 40%–90% of a maximum length of each main recess.

8. The insert according to claim 6, wherein each further chip-breaking recess has a maximum length that if 40%–90% of a maximum length of each main recess.

* * * * *